United States Patent Office 3,023,557
Patented Mar. 6, 1962

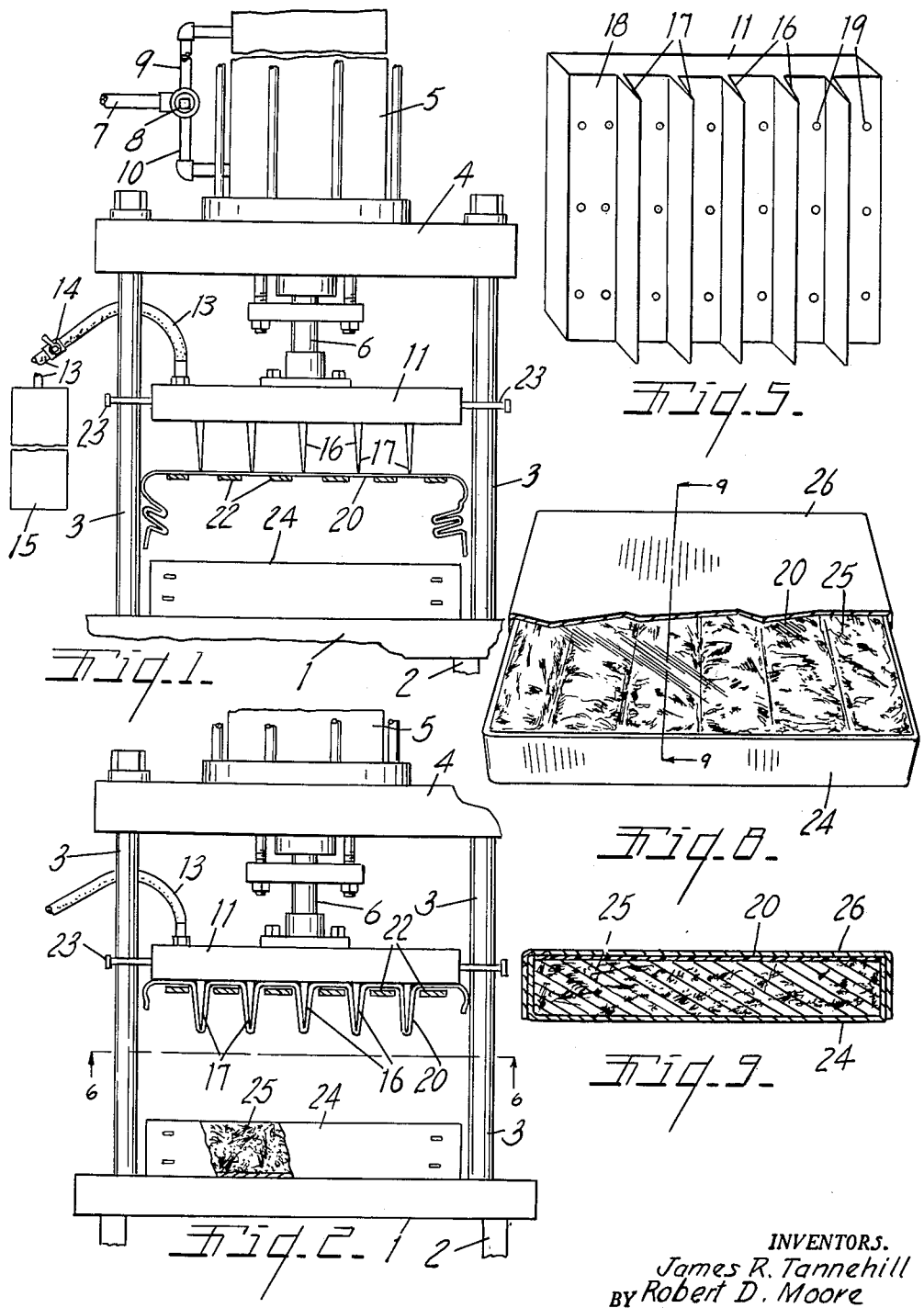

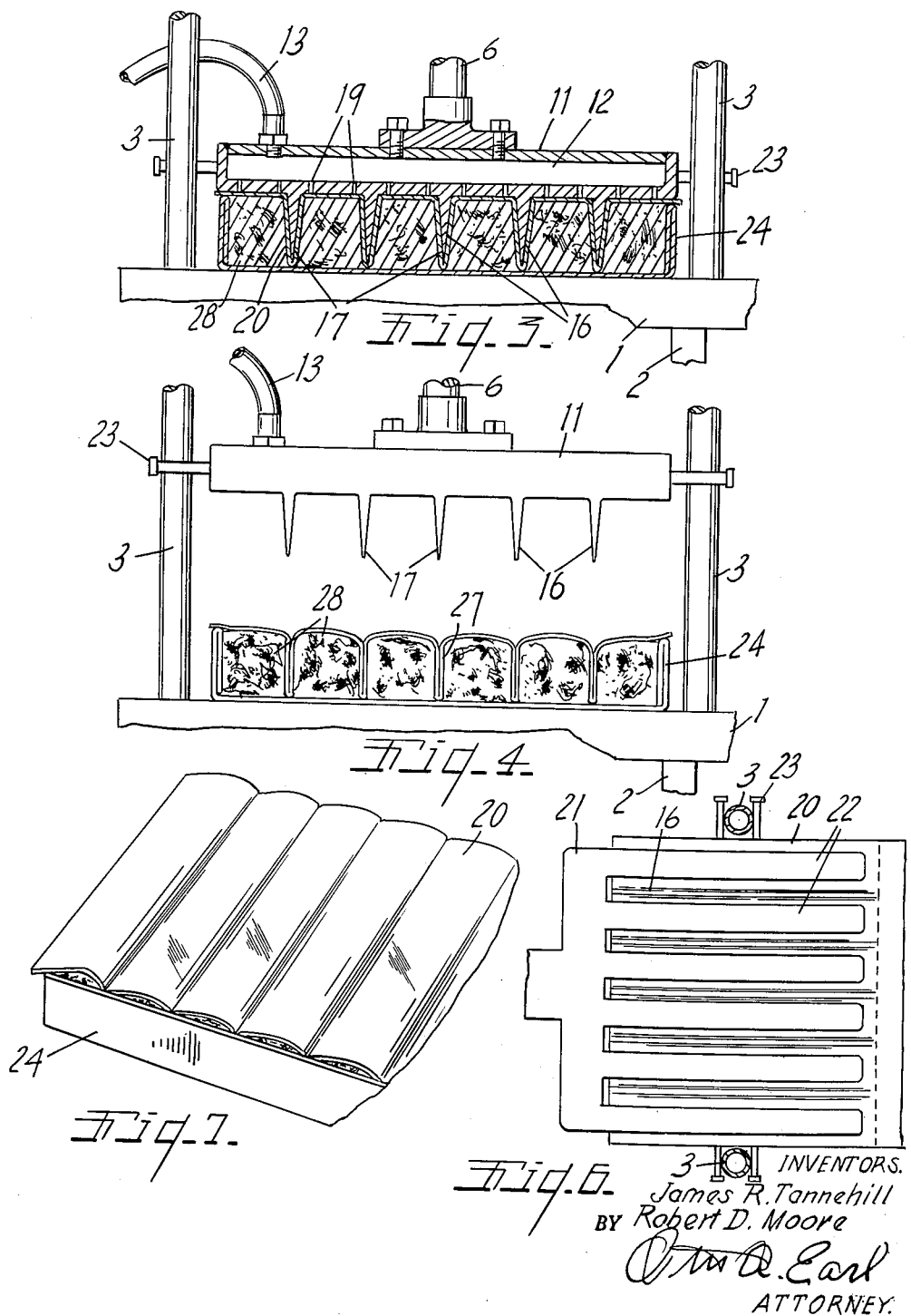

3,023,557
APPARATUS FOR USE IN AND METHOD OF PACKAGING FOOD PRODUCTS AND THE LIKE
James R. Tannehill and Robert D. Moore, both of P.O. Box 108, Traverse City, Mich.
Filed May 1, 1959, Ser. No. 810,461
15 Claims. (Cl. 53—123)

This invention relates to an apparatus and a method for packaging food products and the like, for example meat, preparatory to freezing or use without freezing. The main objects of this invention are, First, to provide an apparatus for packaging food products and the like which permits packaging and freezing in packages or containers so that sections thereof may be removed in frozen condition without the necessity for slicing or handling the entire contents of the container.

Second, to provide an apparatus which enables the packaging of products in sections in containers which may be handled as a unit and sections thereof of predetermined dimensions removed without disturbing other sections.

Third, to provide an apparatus having these advantages which may be very rapidly and economically operated.

Fourth, to provide a method of packaging food products in sections so that the sections may be readily separated for use.

Objects relating to details and economies of the invention will appear from the description to follow. The invention is defined and pointed out in the claims.

A preferred embodiment of the invention is illustrated in the accompanying drawing, in which:

FIG. 1 is a fragmentary front elevational view of an apparatus embodying our invention with the head member in retracted position and a wrapping sheet shown in an initial position relative to the head member.

FIG. 2 is a corresponding view with the part actuated to position the sheet in operative relation to the head member.

FIG. 3 is an enlarged fragmentary view with the head member in actuated product or material dividing sectioning position.

FIG. 4 is a view corresponding to that of FIG. 3 with the head member in retracted position.

FIG. 5 is a bottom perspective view of the head member.

FIG. 6 is a fragmentary horizontal section on a line corresponding to line 6—6 of FIG. 2.

FIG. 7 is a fragmentary perspective view of the sectioned product.

FIG. 8 is a perspective view illustrating the container with the divided product therein, the cover being partially broken away.

FIG. 9 is a section through the container and product therein on a line corresponding to line 9—9 of FIG. 8.

It should be understood that in the accompanying drawings the several parts are shown mainly conventionally. While the structure and method of this invention are particularly desirable for use in connection with packaging of meat preliminary to freezing, the apparatus and method is desirable for use in packaging other materials where it is desired to remove only portions of the contents of a container at one time and it permits such removal without disturbing other remaining portions. As an example, it is common practice for the packers to package meat in 50 pound containers. The meat is frozen and delivered to the consumer in frozen condition and must be kept frozen preliminary to use, and it has been the practice to use slicing machines in the form of saws to cut a desired section from the mass. That is not only somewhat difficult work but quite frequently results in injury to the operator. The applicants' apparatus and method eliminate such sectioning on the part of the consumer.

In the accompanying drawing 1 represents the head or base member commonly provided with legs indicated at 2. This bed member is provided with uprights 3 connected at their upper ends by the crosshead 4 on which the cylinder 5 is mounted, the cylinder being provided with a plunger 6 which projects downwardly from the crosshead, the details of the cylinder and plunger not being illustrated as they form no part of our invention. The cylinder is provided with a connection 7 to a source of pressure, hydraulic or air controlled by the three-way valve 8, which controls the delivery to the upper and lower portions of the cylinder, that is, above or below the plunger head, the connections being conventionally indicated at 9 and 10. The crosshead 11 is mounted on the plunger rod 6 and is provided with a suction chamber 12 connected to a source of suction, conduit or pipe 13, provided with a control valve 14, the source being conventionally illustrated at 15.

The head member 11 is provided with a plurality of downwardly projecting laterally spaced blades 16 of uniform width and desirably downwardly tapering to a substantially sharp edge 17. The face 18 of the head member is provided with a plurality of suction openings 19 desirably arranged closely adjacent to the blades and in uniform relation thereto as is illustrated in FIGS. 3 and 5. The purpose of the suction is to position the sheet 20 around the blades and in supported relation thereto and to the face of the head member, as illustrated in FIGS. 2 and 3. To facilitate this positioning a sheet supporting means, designated by the numeral 21, is provided including a plurality of fingers or arms 22 laterally spaced according to the spacing of the blades, see FIGS. 1, 2 and 6. The supporting means for the member 21 are not illustrated as it may be considerably varied, but the member in any case should be reciprocatingly mounted so that it can be projected into position to support the sheet 20, as illustrated in FIG. 1, and may be vertically reciprocated to position the sheet as is illustrated in FIG. 2, in which position it is retained by the suction of the head member. The relative position of the head member and the sheet supporting means may result from the vertical reciprocation of either, but it will be understood that with the sheet in the position shown in FIG. 2 the sheet supporting member is retracted and the sheet is retained on the head member by means of the suction within the head member, and it is closely wrapped around the blades so that it cannot shift relative thereto.

In the embodiment illustrated, rotary movement of the head member with the plunger rod is prevented by the guide members 23 which project from the head member into coacting relation to the uprights 3. In use a container 24 is filled with the desired amount of meat or other product, conventionally illustrated at 25, and the container is placed upon the bed member 1 in vertical alignment with the head member, but with the cover 26 removed. With the sheet, which may be of various materials—polyethylene for example—wrapped around the blades and in supported relation to the head member, the head member is actuated to force the blades with the sheet wrapped thereon into the contents of the container dividing it into sections, the actuated position being illustrated in FIG. 3. While in this actuated position the valve 14 is manipulated to break the suction in the head member and the head member retracted as is illustrated in FIG. 4, which leaves the sheet in the position illustrated in FIG. 4 with the folds 27 thereof, that is, the portions that have been wrapped around the blades are left in the form of folds between the sections indicated at 28 in FIGS. 3 and 4. When the product is meat or another food product which is to be frozen, the cover 26 is applied and it is frozen in that condition and delivered in frozen condition. The user can remove the sections one by one as may be desired and the sections are desirably of such dimensions transversely that they can be fed into a common grinding machine for use, for example, in hamburger or the like. Of course the sections may be sliced and served in sliced condition as may be desired. This apparatus and method of packaging may be very economically practiced.

We have illustrated and described our invention in a simple and practical embodiment thereof. We have not attempted to illustrate the various modifications and adaptations which we contemplate or which may be desirable for certain conditions and use in connection with certain products, as it is believed that this disclosure will enable those skilled in the art to embody or adapt our invention as may be desired.

Having thus described the invention, what is claimed as new and desired to secure by Letters Patent is:

1. An apparatus of the class described comprising a bed member having laterally spaced uprights thereon, a crosshead mounted on said uprights in vertically spaced relation to said bed member, a cylinder mounted on said crosshead and provided with a plunger rod projecting downwardly relative to said cross head, a downwardly facing head member operatively connected to said plunger rod and disposed between said uprights below said crosshead and provided with guide members coacting with said uprights, said head member having a plurality of laterally spaced parallel downwardly projecting blades on its face, said head member having a suction chamber therein and a plurality of suction openings in its face, sheet supporting means including a plurality of laterally spaced arms, said suction head and arms being vertically movable relative to each other, certain of the arms being at the outer sides of the outer blades, the arms of said supporting means in one position thereof relative to said blades being in a plane below the lower edges of the blades so that a sheet may be supportedly positioned thereon below the blades, said sheet supporting arms coacting with the suction of said suction head to wrap a sheet around the blades and position it against the face of the head member to be retained thereon by the suction of said head member, and means for actuating said head member with the sheet so wrapped around the blades to force the blades into material positioned on the bed member and divide the material into sections with the folded portions of the sheet between the sections.

2. An apparatus of the class described comprising a bed member, a crosshead mounted in vertically spaced relation to said bed member, a cylinder mounted on said crosshead and provided with a plunger rod projecting downwardly relative to said crosshead, a downwardly facing head member operatively connected to said plunger rod and disposed between said uprights below said crosshead, said head member having a plurality of laterally spaced parallel downwardly projecting blades on its face, said head member having a suction chamber therein and a plurality of suction openings in its face, sheet supporting means including a plurality of laterally spaced arms, said suction head and arms being vertically movable relative to each other, certain of the arms being at the outer sides of the outer blades, the arms of said supporting means in one position thereof relative to said blades being in a plane below the lower edges of the blades so that a sheet may be supportedly positioned thereon below the blades, said sheet supporting arms coacting with the suction of said suction head to wrap a sheet around the blades and position it against the face of the head member to be retained thereon by the suction of said head member, and means for actuating said head member with the sheet so wrapped around the blades to force the blades into material positioned on the bed member and divide the material into sections with the folded portions of the sheet between the sections.

3. An apparatus of the class described comprising a bed member having laterally spaced uprights thereon, a crosshead mounted on said uprights in vertically spaced relation to said bed member, a cylinder mounted on said crosshead and provided with a plunger rod projecting downwardly relative to said crosshead, a downwardly facing head member operatively connected to said plunger rod and disposed between said uprights below said crosshead and provided with guide members coacting with said uprights, said head member having a plurality of laterally spaced parallel downwardly projecting blades fixedly connected to its face, said head member also having a suction chamber therein with a plurality of suction openings in its face, there being openings between the blades and at the outer sides of the outer blades, the suction of said suction head acting to supportedly hold a sheet wrapped around the blades and against the face of the head member between the blades, means for actuating said head member with a sheet so positioned around the blades and so retained upon the head member and around the blades to force the blades into material positioned on the bed member and divide it into sections with the folded portions of the sheet between the sections and with the portions of the sheet between the folds thereof in covering relation to the sections of the product, and means for controlling the actuation of said head member and the suction in said suction chamber thereof.

4. An apparatus of the class described comprising a bed member, a crosshead mounted in vertically spaced relation to said bed member, a cylinder mounted on said crosshead and provided with a plunger rod projecting downwardly relative to said crosshead, a downwardly facing head member operatively connected to said plunger rod, said head member having a plurality of laterally spaced parallel downwardly projecting blades fixedly connected to its face, said head member also having a suction chamber therein with a plurality of suction openings in its face, the suction of said suction head acting to supportedly hold a sheet wrapped around the blades and against the face of the head member between the blades, means for actuating said head member with a sheet so positioned around the blades and so retained upon the head member and around the blades to force the blades into material positioned on the bed member and divide it into sections with the folded portions of the sheet between the sections and with the portions of the sheet between the folds thereof in covering relation to the sections of the product, and means for controlling the actuation of said head member and the suction in said suction chamber thereof.

5. An apparatus of the class described comprising a bed member, a crosshead mounted in vertically spaced relation to said bed member, a cylinder mounted on said cross head and provided with a plunger rod projecting downwardly relative to said cross head, a downwardly facing head member operatively connected to said plunger rod, said head member having a plurality of laterally spaced parallel downwardly tapered downwardly projecting blades fixedly connected to its face, said head member also having a suction chamber therein with a plurality of suction openings in its face, the suction of said suction head acting to supportedly hold a sheet wrapped around the blades and against the face of the head member between the blades, means for actuating said head member with a sheet so positioned around the blades and so retained upon the head member and around the blades to force the blades into material positioned on the bed member and divide it into sections with the folded portions of the sheet between the sections and with the portions of the sheet between the folds thereof in covering relation to the sections of the product, and means for controlling the actuation of said head member and the suction in said suction chamber thereof.

6. An apparatus of the class described comprising a bed member, a downwardly facing head member mounted for vertical reciprocating movement above said bed member and having a plurality of laterally spaced parallel downwardly tapered downwardly projecting blades on its face, said head member having a suction chamber therein and a plurality of suction openings in its face there being openings between the blades and at the outer sides of the outer blades, sheet supporting means including a plurality of laterally spaced arms, certain of the arms being at the outer sides of the outer blades, the arms of said supporting means in one position thereof relative to said blades being in a plane below the lower edges of the blades so that a sheet may be supportedly positioned thereon below the blades, said sheet supporting arms coacting with the suction of said suction head to wrap a sheet around the blades and position it against the face of the head member to be retained thereon by the suction of said head member, and means for actuating said head member with the sheet so wrapped around the blades to force the blades into material position on the bed member and divide the material into sections with the folded portions of the sheet between the sections.

7. An apparatus of the class described comprising a bed member, a downwardly facing head member mounted for vertical reciprocating movement above said bed member and having a plurality of spaced downwardly projecting blades on its face, said head member having a suction chamber therein and a plurality of suction openings in its face, sheet supporting means including a plurality of laterally spaced arms, certain of the arms being at the outer sides of the outer blades, the arms of said supporting means in one position thereof relative to said blades being in a plane below the lower edges of the blades so that a sheet may be supportedly positioned thereon below the blades, said sheet supporting arms coacting with the suction of said suction head to wrap a sheet around the blades and position it against the face of the head member to be retained thereon by the suction of said head member, and means for actuating said head member with the sheet so wrapped around the blades to force the blades into material position on the bed member and divide the material into sections with the folded portions of the sheet between the sections.

8. An apparatus of the class described comprising a bed member, a downwardly facing head member mounted for vertical reciprocating movement above said bed member and having a plurality of laterally spaced parallel downwardly tapered downwardly projecting blades fixedly connected to its face, said head member having a suction chamber therein and a plurality of suction openings in its face, there being openings between the blades and at the outer sides of the outer blades, the suction of said suction head acting to supportedly hold a sheet wrapped around the blades and against the face of the head member between the blades, and means for actuating said head member with a sheet so positioned around the blades and so retained upon the head member and around the blades to force the blades into material positioned on the bed member and divide it into sections with the folded portions of the sheet between the sections and with the portions of the sheet between the folds thereof in covering relation to the sections of the product.

9. An apparatus of the class described comprising a bed member, a downwardly facing head member mounted for vertical reciprocating movement above said bed member and having a plurality of laterally spaced downwardly projecting blades fixedly connected to its face, said head member having a suction chamber therein and a plurality of suction openings in its face, there being openings between the blades and at the outer sides of the outer blades, the suction of said suction head acting to supportedly hold a sheet wrapped around the blades and against the face of the head member between the blades, and means for actuating said head member with a sheet so positioned around the blades and so retained upon the head member and around the blades to force the blades into material positioned on the bed member and divide it into sections with the folded portions of the sheet between the sections and with the portions of the sheet between the folds thereof in covering relation to the sections of the product.

10. An apparatus of the class described comprising a bed member, a head member mounted for reciprocating movement relative to said bed member, said head member having a plurality of laterally spaced parallel projecting blades of uniform width and of outwardly tapered cross section fixedly connected to its face, said head member having suction openings in its face disposed closely adjacent to the juncture of the blades with the face, the suction in said suction openings acting to supportedly hold a sheet to the face of said head member and in wrapped around relation to said blades thereon, means for alternately producing and cutting off suction in said suction openings, and means for actuating said head member with a sheet supportedly carried thereby and wrapped around the blades and held against the face of the head member by suction in said suction openings and force the blades into material positioned on the bed member and divide it into sections with the portions of the sheet between the sections remaining therebetween when the head member is retracted.

11. An apparatus of the class described comprising a bed member, a head member mounted for reciprocating movement relative to said bed member, said head member having a plurality of spaced projecting blades fixedly connected to its face, said head member having suction openings in its face disposed closely adjacent to the juncture of the blades with the face, the suction in said suction openings acting to supportedly hold a sheet to the face of said head member and in wrapped around relation to said blades thereon, means for alternately producing and cutting off suction in said suction openings, and means for actuating said head member with a sheet supportedly carried thereby and wrapped around the blades and held against the face of the head member by suction in said suction openings and force the blades into material positioned on the bed member and divide it into sections with the portions of the sheet between the sections remaining therebetween when the head member is retracted.

12. An apparatus of the class described comprising a bed member, a head member mounted for reciprocating movement relative to said bed member, said head member having a plurality of laterally spaced parallel projecting blades of uniform width and of outwardly tapered cross section fixedly connected to its face, said head member having suction openings in its face, the suction in said suction openings acting to supportedly hold a sheet to the face of said head member and in wrapped around relation to said blades thereon, means for alternately producing and cutting off suction in said suction openings, and means for actuating said head member with a sheet supportedly carried thereby and wrapped around the blades and held against the face of the head member by suction in said suction openings and force the blades into material positioned on the bed member and divide it into sections with the portions of the sheet between the sections remaining therebetween when the head member is retracted.

13. An apparatus of the class described comprising a bed member, a head member mounted for reciprocating movement relative to said bed member, said head member having a plurality of spaced projecting blades fixedly connected to its face, said head member having suction openings in its face, the suction in said suction openings acting to supportedly hold a sheet to the face of said head member and in wrapped around relation to said blades thereon, means for alternately producing and cutting off suction in said suction openings, and means for actuating said head member with a sheet supportedly carried thereby and wrapped around the blades and held against the face of the head member by suction in said suction openings and force the blades into material positioned on the bed member and divide it into sections with the portions of the sheet between the sections remaining therebetween when the head member is retracted.

14. An apparatus of the class described comprising a bed member, a head member mounted for reciprocating movement relative to the bed member and having a face provided with a plurality of uniformly spaced parallel projecting blades of uniform width and of outwardly tapering cross section fixedly connected thereto, said head member having a plurality of suction openings in its face between said blades, means for alternately producing and cutting off suction in said suction openings, the suction in said suction openings acting to supportedly retain a sheet on the face of the head member in wrapped around relation to said blades thereon, means for reciprocatingly actuating said head member with a sheet supportedly retained thereon by the suction and in wrapped around relation to said blades to force the blades into material positioned on said bed member and divide it into sections, the means for cutting off the suction being timed to act before retracting movement of the head member begins so that the portion of the sheet forced into the material by said blades remains between the sections thereof when the head member is retracted.

15. An apparatus of the class described comprising a bed member, a head member mounted for reciprocating movement relative to the bed member and having a face, said face having a plurality of laterally spaced parallel blades fixedly connected to and projecting therefrom, said head member having a plurality of suction openings in its face between said blades, means for alternately producing and cutting off suction in said suction openings, the suction in said suction openings acting to supportedly retain a sheet on the face of the head member in wrapped around relation to said blades thereon, means for reciprocatingly actuating said head member with a sheet supportedly retained thereon by the suction and in wrapped around relation to said blades to force the blades into material positioned on said bed member and divide it into sections, the means for cutting off the suction being timed to act before retracting movement of the head member begins so that the portion of the sheet forced into the material by said blades remains between the sections thereof when the head member is retracted.

References Cited in the file of this patent

UNITED STATES PATENTS

| 1,387,805 | Roberts | Aug. 16, 1921 |
| 1,849,438 | Rumsey | Mar. 15, 1932 |
| 1,967,972 | Rottenberg | July 24, 1934 |
| 1,975,936 | Goodwin | Oct. 9, 1934 |
| 2,234,525 | Guldbech | Mar. 11, 1941 |
| 2,246,016 | Sinclair | June 17, 1941 |
| 2,657,423 | Elsaesser | Nov. 3, 1953 |

FOREIGN PATENTS

| 693,584 | Great Britain | July 1, 1953 |